UNITED STATES PATENT OFFICE.

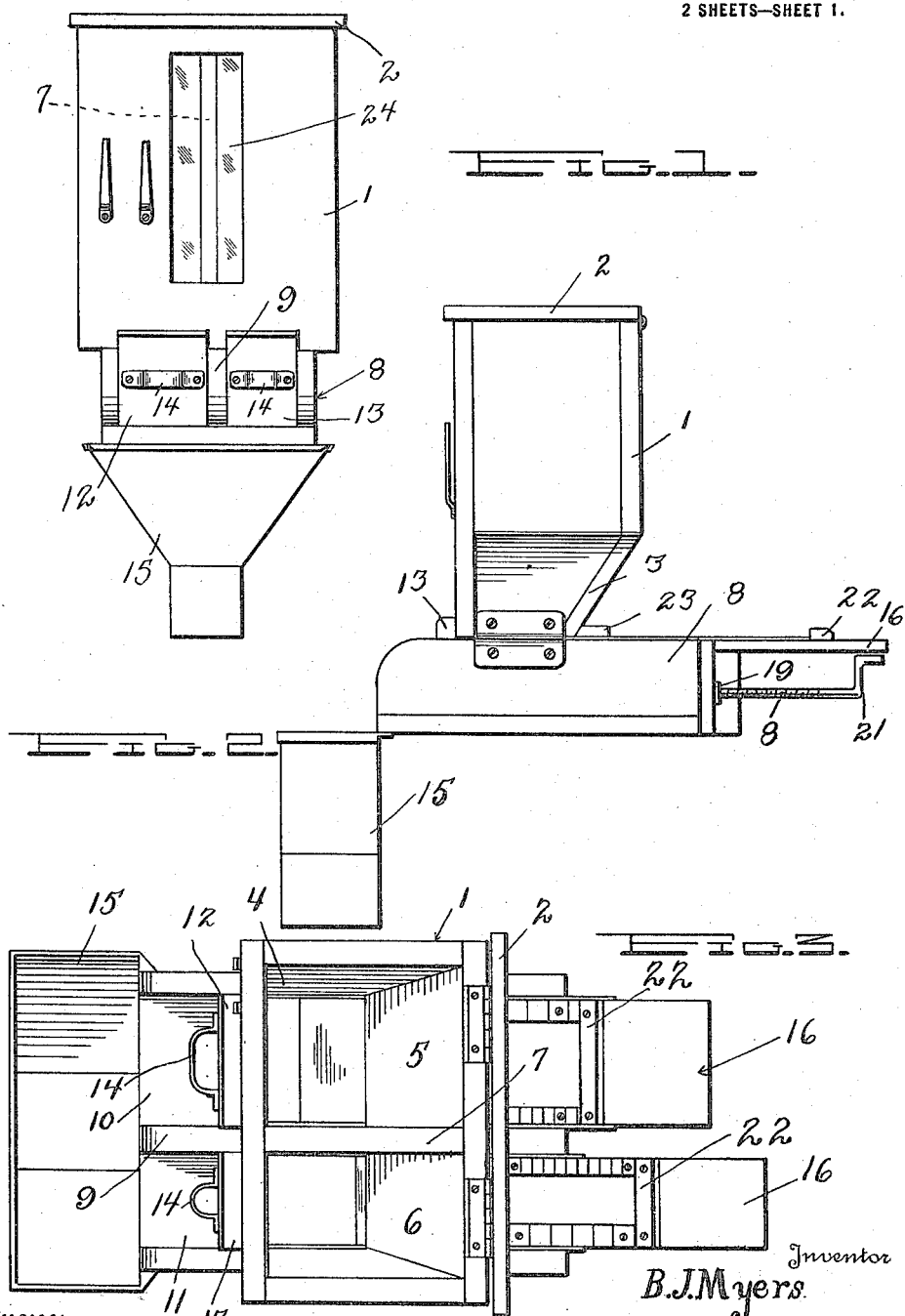

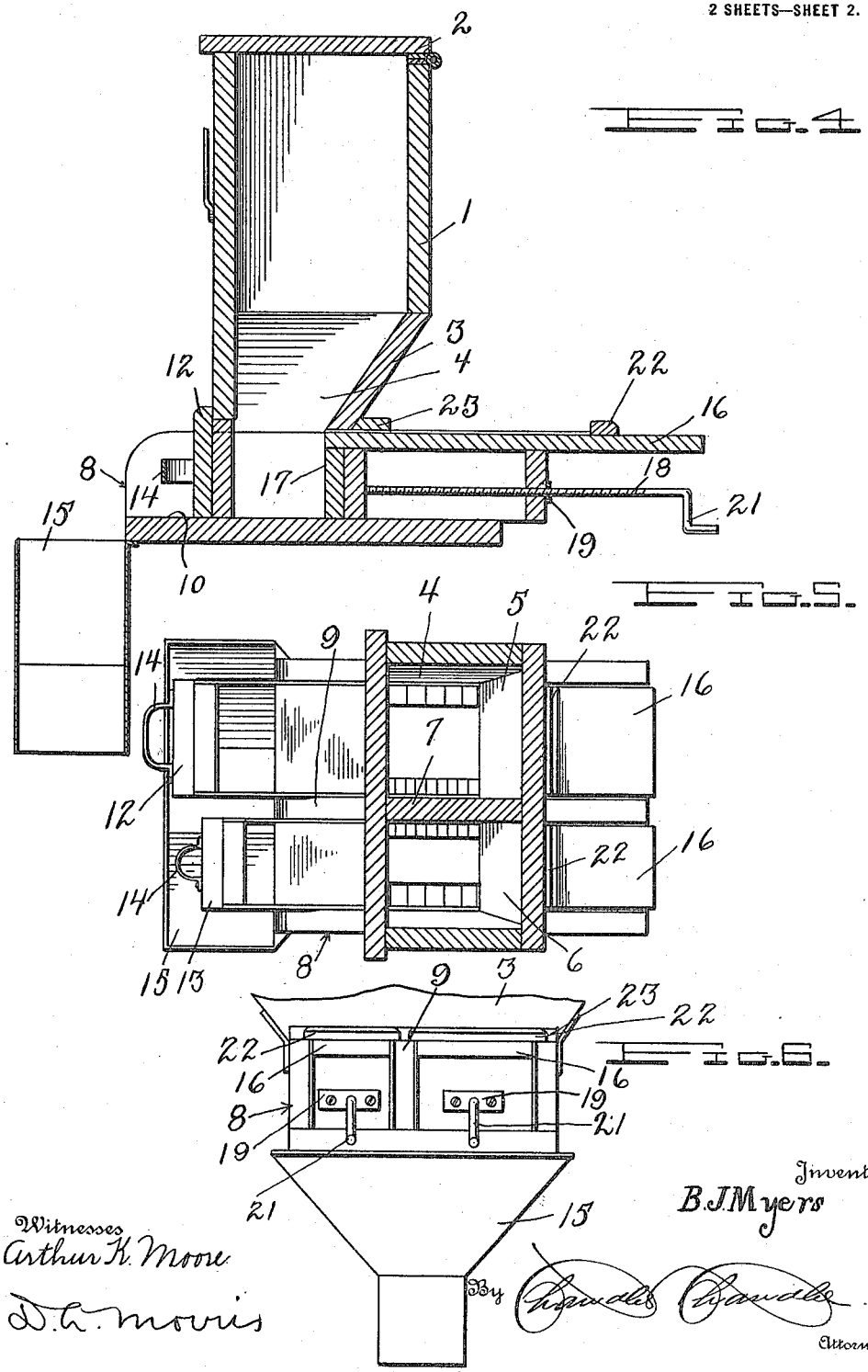

BASCOMB J. MYERS, OF LANCASTER, SOUTH CAROLINA, ASSIGNOR TO E. B. DONNALD, OF GOLDVILLE, SOUTH CAROLINA.

DISPENSING-BIN.

1,221,575.  Specification of Letters Patent.  Patented Apr. 3, 1917.

Application filed August 3, 1914. Serial No. 854,810.

*To all whom it may concern:*

Be it known that I, BASCOMB J. MYERS, a citizen of the United States, residing at Lancaster, in the county of Lancaster, State of South Carolina, have invented certain new and useful Improvements in Dispensing-Bins; and I do hereby declare the following to be a full, clear, and exact description of the invention, such as will enable others skilled in the art to which it appertains to make and use the same.

This invention relates to a dispensing bin.

An object of the invention is to so construct a device of this character that predetermined amounts of material may be fed from the bin to portable containers.

A further object of the invention is to provide measuring drawers in the device which are adjustable so as to contain various amounts of material.

A still further object of the invention is to adjustably attach these drawers to measuring slides so that when they are drawn from the hopper they will come into alinement with the conveyer funnel irrespective of their adjustment.

A still further object is to provide measuring scales detachably mounted on the slides so that the proper adjustment of the drawers may be readily determined.

With these and other objects in view, such as will appear as the description progresses, my invention comprises the combination and arrangement of parts as herein set forth and subsequently claimed.

Referring to the drawings,

Figure 1 is a front elevation of my device,

Fig. 2 is a side elevation thereof,

Fig. 3 is a plan view with the cover of the hopper open and showing the measuring drawers in adjusted positions, Fig. 4 is a section on line 4—4 of Fig. 3, Fig. 5 is a fragmental sectional view of the device showing the measuring drawers withdrawn from the hopper, the adjustment of the said drawers being different, and Fig. 6 is a fragmental rear elevation.

Referring now more particularly to the drawings wherein similar parts are indicated by similar reference characters:

My device comprises a substantially rectangular hopper 1 closed at its upper end by hinged door 2 and tapered at its lower end as at 3 so as to form an opening 4. Dividing this hopper 1 into two compartments 5 and 6 is a vertically extending wall 7.

This hopper 1 is mounted upon a trough-shaped guide member 8 which is divided longitudinally by a wall 9 into two guideways, 10 and 11, the widths of which correspond to the widths of the compartments 5 and 6 respectively.

Slidably mounted in these guideways 10 and 11 are drawers 12 and 13 which are of rectangular formation and are open at their bottoms. The forward ends of these drawers are provided with handles 14 by means of which the said drawers may be operated in the guideways 10 and 11 to withdraw material from the hopper 1 and deposit the same in the funnel 15 through which funnel the material passes to a portable container such as a bag or the like.

In order that the amount of material which is withdrawn from the bin may be varied I have provided in each of the drawers 12 and 13 a slide 16 with relation to which the drawer is adjustable. This slide comprises a horizontal plate which is slidable between the sides of the drawer and over the rear end thereof. Secured to the forward end of this horizontal plate is a downwardly extending vertical block 17 the lower edge of which is adapted to rest upon the bottom of the adjacent guideway.

In order that the drawer may be adjusted with relation to the slide I have provided an operating screw 18 one end of which is revolubly mounted in the block 17 and the other end of which passes through the rear wall of the drawer and a plate 19 secured to the outer face of the said rear wall and having a threaded aperture therein the threads of which engage threads on the screw 18. On the extreme end of this screw 18 is formed a crank handle 21 by means of which the drawer may be adjusted with relation to the slide to vary the opening between the block 17 and the front end of the said drawer.

Secured to the upper face of each of the horizontal plates of the slides 16 is a transversely extending strip 22 which is secured to the said horizontal plate a distance from the front end thereof which is equal to the distance from the front end of the trough-shaped member 8 to the stop 23 against which the said strip strikes at the end of the outward movement of the drawer so that the edge of the block 17 will always, at this time, be in alinement with the edge of the member 8 irrespective of the distance between this block and the forward end of the drawer.

In order that the proper adjustment of each of the drawers may be accurately determined for a predetermined amount of material I have provided on each of the horizontal plates of the slide 16 detachable scales the graduations on each of which accurately indicate the proper adjustment of the drawer for the conveyance of a certain amount of a particular material. These scales are made detachable from the slides so that they may be replaced readily by others which will indicate the adjustment for different materials.

In the forward face of the hopper 1 I have provided a glass covered opening 24 by means of which the amount of material in both of the compartments 5 and 6 may be readily observed and I have also secured to the outer face of this front wall a pair of spaced metallic clips in which a card designating the character of the material within the bin may be removably held.

In operation assuming that there is material within the hopper 1 and it is desired to measure out a predetermined amount of this material and withdraw the same from the hopper the crank handle on the end of the screw 18 and in connection with the proper drawer is rotated until the drawer is adjusted on the slide to such a point that the graduations on the proper scale on the said slide indicate that the distance between the block 17 and the forward end of the drawer creates a space which, when filled, accommodates the desired amount of material. The material in the hopper will flow by gravity into the drawer and fill the aforementioned space.

The handle 14 on the forward end of the draw is then grasped and the drawer withdrawn from its guide until the strip 22 contacts with the stop 23 at which time the forward edge of the block 17 will be in alinement with the forward edge of the member 8 and the portion of the drawer which contains the material will be directly over the funnel, so that the material in said drawer will drop through the opening in the bottom thereof, into the funnel.

From the foregoing description, it may be seen that I have provided a measuring bin having drawers slidably mounted therein, which drawers are adjustably mounted on slides so that the amount of material conveyed from the hopper by the drawers may be varied.

I have so constructed the device that the forward ends of the slides which push the material from the hopper are stopped, during the withdrawal of the drawer from the hopper, in alinement with the forward edge of the drawer guide so as to insure the depositing of all material in the funnel.

While I have described and illustrated a particular construction it has merely been for the sake of convenience and I do not wish to be limited to that particular construction for it is obvious that numerous changes may be made in the construction of the device within the scope of the invention as defined by the claim.

What I claim is:

In combination, a trough, a hopper communicating at its lower end with said trough, a funnel secured to communicate with the lower portion of said trough remote from said hopper, a bottomless drawer mounted for sliding movement in said trough beneath said hopper and over said funnel, a plate mounted for sliding movement upon the top of said drawer, a block depending from the forward edge of said plate into said drawer, a screw member extending from the rear end of said drawer and connected at its end to said block whereby the latter and said plate may be adjusted longitudinally of said drawer, a stop on said plate projecting above the same for engagement with said hopper, and the distance between said stop and said block being equal to that between said block and the innermost edge of said funnel.

In testimony whereof, I affix my signature, in the presence of two witnesses.

BASCOMB J. MYERS.

Witnesses:
 D. L. MORRIS,
 HENRY E. COOPER.

Copies of this patent may be obtained for five cents each, by addressing the "Commissioner of Patents, Washington, D. C."